United States Patent
Yi et al.

(10) Patent No.: US 9,392,032 B2
(45) Date of Patent: Jul. 12, 2016

(54) SESSION TRANSFER METHOD, DEVICE AND SYSTEM

(75) Inventors: Qiang Yi, Beijing (CN); Hui Jin, Beijing (CN); Shuiping Long, Beijing (CN); Xiaoyan Duan, Beijing (CN)

(73) Assignee: HUAWEI DEVICE CO., LTD., Shenhen (CN)

( * ) Notice: Subject to any disclaimer, the term of this patent is extended or adjusted under 35 U.S.C. 154(b) by 1051 days.

(21) Appl. No.: 13/289,771

(22) Filed: Nov. 4, 2011

(65) Prior Publication Data

US 2012/0044838 A1 Feb. 23, 2012

Related U.S. Application Data

(63) Continuation of application No. PCT/CN2010/072372, filed on Apr. 30, 2010.

(30) Foreign Application Priority Data

May 5, 2009 (CN) .......................... 2009 1 0139151

(51) Int. Cl.
*H04L 12/28* (2006.01)
*H04M 3/42* (2006.01)
(Continued)

(52) U.S. Cl.
CPC ........ *H04L 65/1016* (2013.01); *H04L 65/1083* (2013.01); *H04L 65/4046* (2013.01); *H04L 67/04* (2013.01); *H04L 67/14* (2013.01); *H04W 36/0022* (2013.01); *H04M 3/4228* (2013.01);
(Continued)

(58) Field of Classification Search
CPC ..... H04M 3/4228; H04M 3/56; H04M 7/006; H04Q 2213/13098; H04L 65/4046; H04L 67/04; H04L 67/14; H04W 36/0022; H04W 36/0027

See application file for complete search history.

(56) References Cited

U.S. PATENT DOCUMENTS 5,987,318 A 11/1999 Alperovich et al.
7,027,577 B2 * 4/2006 Gourraud et al. ........ 379/202.01
(Continued)

FOREIGN PATENT DOCUMENTS

CN 1231807 A 10/1999
CN 1534972 A 10/2004
(Continued)

OTHER PUBLICATIONS

Office Action issued in corresponding European Patent Application No. 10772007.0, mailed Mar. 19, 2013.
(Continued)

*Primary Examiner* — Alpus H Hsu
(74) *Attorney, Agent, or Firm* — Brinks Gilson & Lione

(57) ABSTRACT

The present invention discloses a session transfer method, a device and a system, which relate to the communication field and are used to solve the problem that a conference to which a session belongs cannot be controlled after the session is transferred. The technical solution provided in the present invention includes: determining whether a User Equipment (UE) has at least one session belonging to a conference during a process that a session of the UE is transferred from a source network to a target network and sending information relevant to the conference to the UE or a Mobile Switching Center (MSC) server if the UE has at least one session belonging to the conference (102). The embodiments of the present invention can be applied in a wireless communication network.

7 Claims, 7 Drawing Sheets

(51) Int. Cl.
*H04W 4/16* (2009.01)
*H04W 36/00* (2009.01)
*H04L 29/06* (2006.01)
*H04L 29/08* (2006.01)
*H04M 3/56* (2006.01)

(52) U.S. Cl.
CPC ....... *H04M 3/56* (2013.01); *H04Q 2213/13098* (2013.01); *H04W 36/0027* (2013.01)

(56) References Cited

U.S. PATENT DOCUMENTS

| | | | |
|---|---|---|---|
| 7,526,313 B2 | | 4/2009 | Mousseau et al. |
| 7,769,383 B2 * | | 8/2010 | Deshpande ............ H04M 7/123 370/328 |
| 7,885,208 B2 * | | 2/2011 | Mutikainen et al. .......... 370/260 |
| 7,983,228 B1 * | | 7/2011 | Choksi ............................ 370/338 |
| 8,213,419 B2 * | | 7/2012 | Zhu et al. ....................... 370/356 |
| 8,233,417 B1 * | | 7/2012 | Goldner ...................... 370/310.2 |
| 8,412,835 B2 * | | 4/2013 | Song et al. ..................... 709/228 |
| 8,477,720 B2 * | | 7/2013 | Vikberg ............... H04W 48/18 370/331 |
| 9,179,291 B1 * | | 11/2015 | Stegall ..................... H04W 8/18 |
| 2002/0142761 A1 | | 10/2002 | Wallstedt et al. |
| 2004/0037406 A1 * | | 2/2004 | Gourraud ................. 379/202.01 |
| 2004/0190498 A1 | | 9/2004 | Kallio et al. |
| 2004/0196867 A1 | | 10/2004 | Ejzak et al. |
| 2005/0083909 A1 * | | 4/2005 | Kuusinen et al. .............. 370/352 |
| 2006/0056440 A1 * | | 3/2006 | Khartabil ....................... 370/447 |
| 2006/0268781 A1 | | 11/2006 | Svensson et al. |
| 2007/0058637 A1 | | 3/2007 | Lo |
| 2007/0058788 A1 * | | 3/2007 | Mahdi ............... H04L 29/06027 379/88.17 |
| 2007/0100981 A1 * | | 5/2007 | Adamczyk et al. ........... 709/223 |
| 2007/0129051 A1 * | | 6/2007 | Sung et al. ..................... 455/403 |
| 2007/0189220 A1 | | 8/2007 | Oberle et al. |
| 2007/0213078 A1 * | | 9/2007 | Shaheen ............. H04W 76/002 455/466 |
| 2007/0243876 A1 * | | 10/2007 | Duan ............................ 455/445 |
| 2008/0089307 A1 | | 4/2008 | Tuijn et al. |
| 2008/0090570 A1 | | 4/2008 | Deshpande et al. |
| 2008/0159276 A1 * | | 7/2008 | Kuusinen et al. .............. 370/356 |
| 2008/0162637 A1 * | | 7/2008 | Adamczyk et al. ........... 709/204 |
| 2008/0273682 A1 * | | 11/2008 | Bakker ............. H04M 3/42314 379/201.12 |
| 2009/0119389 A1 * | | 5/2009 | Mu et al. ........................ 709/219 |
| 2009/0196286 A1 | | 8/2009 | Long et al. |
| 2009/0319676 A1 * | | 12/2009 | Jin et al. .......................... 709/228 |
| 2010/0077459 A1 * | | 3/2010 | Mahdi et al. ....................... 726/4 |
| 2010/0195644 A1 * | | 8/2010 | Hao .............................. 370/352 |
| 2010/0215037 A1 * | | 8/2010 | Long et al. .................... 370/352 |
| 2010/0246444 A1 * | | 9/2010 | Witzel et al. ................... 370/255 |
| 2010/0257273 A1 * | | 10/2010 | Mutikainen et al. .......... 709/227 |
| 2010/0279670 A1 * | | 11/2010 | Ghai et al. ................. 455/414.3 |
| 2011/0032906 A1 * | | 2/2011 | Mutikainen et al. .......... 370/331 |
| 2011/0032923 A1 * | | 2/2011 | Ho ........................ H04W 88/14 370/342 |
| 2011/0270995 A1 * | | 11/2011 | Mutikainen et al. .......... 709/227 |
| 2011/0299501 A1 * | | 12/2011 | Keller et al. ................... 370/331 |

FOREIGN PATENT DOCUMENTS

| | | |
|---|---|---|
| CN | 1855833 A | 11/2006 |
| CN | 101035068 A | 9/2007 |
| CN | 101090567 A | 12/2007 |
| CN | 101107830 A | 1/2008 |
| CN | 101141273 A | 3/2008 |
| CN | 101262414 A | 9/2008 |
| CN | 101321087 A | 12/2008 |
| CN | 101351032 A | 1/2009 |
| WO | WO 2009/046645 A1 | 4/2009 |

OTHER PUBLICATIONS

Extended European Search Report issued in corresponding European Patent Application No. 10772007.0, mailed Jul. 4, 2012.
T-Mobile, "Usage of Replaces Header for Conference Session Initiation" Change Request, 24.819 CR rev 3, version 0.3.0. 3GPP TSG-CT1 Meeting #39, London, UK, Aug. 29-Sep. 2, 2005. Tdoc C1-051200.
Huawei, "Clarification on Handling of Multiple Access Legs in Mid-Call Services" Change Request 23.237 CR 0094 rev 1, current version 9.0.0. 3GPP TSG-SA WG2 Meeting #72, Hangzhou, China, Mar. 30-Apr. 3, 2009. S2-092098.
ZTE, "Mid-call Services Transfer with Enhanced MSC Server—Forking Method" Agenda Item 8.6.1, Release 9. 3GPP TSG SA WG2 Meeting #71. Budapest, Hungary, Feb. 16-20, 2009. TD S2-091390.
LTE, "3$^{rd}$ Generation Partnership Project; Technical Specification Group Services and System Aspects; Multimedia Subsystem (IMS) Service Continuity Enhancements; Service, Policy and Interaction" Stage 2 (Release 9) 3GPP TR 23.838. V1.0.0, Mar. 2009.
LTE, "3$^{rd}$ Generation Partnership Project; Technical Specification Group Services and Architecture; IP Multimedia Subsystem (IMS) Service Continuity" Stage 2 (Release 9) 3GPP TS 23.237. V9.0.0, Mar. 2009.
Written Opinion of the International Searching Authority issued in corresponding PCT Patent Application No. PCT/CN2010/072372, mailed Aug. 5, 2010.
International Search Report issued in corresponding PCT Patent Application No. PCT/CN2010/072372, mailed Aug. 5, 2010.
3$^{rd}$ Generation Partnership Project, "Technical Specification Group Services and Architecture; IP Multimedia Subsystem (IMS) Service Continuity" Stage 2, Release 9. LTE, 3GPP TS 23.237, V9.0.0, Mar. 2009.
Chinese Patent No. 101883342, issued on Dec. 10, 2014, granted in corresponding Chinese Patent Application No. 200910139151.4, 20 pages.

* cited by examiner

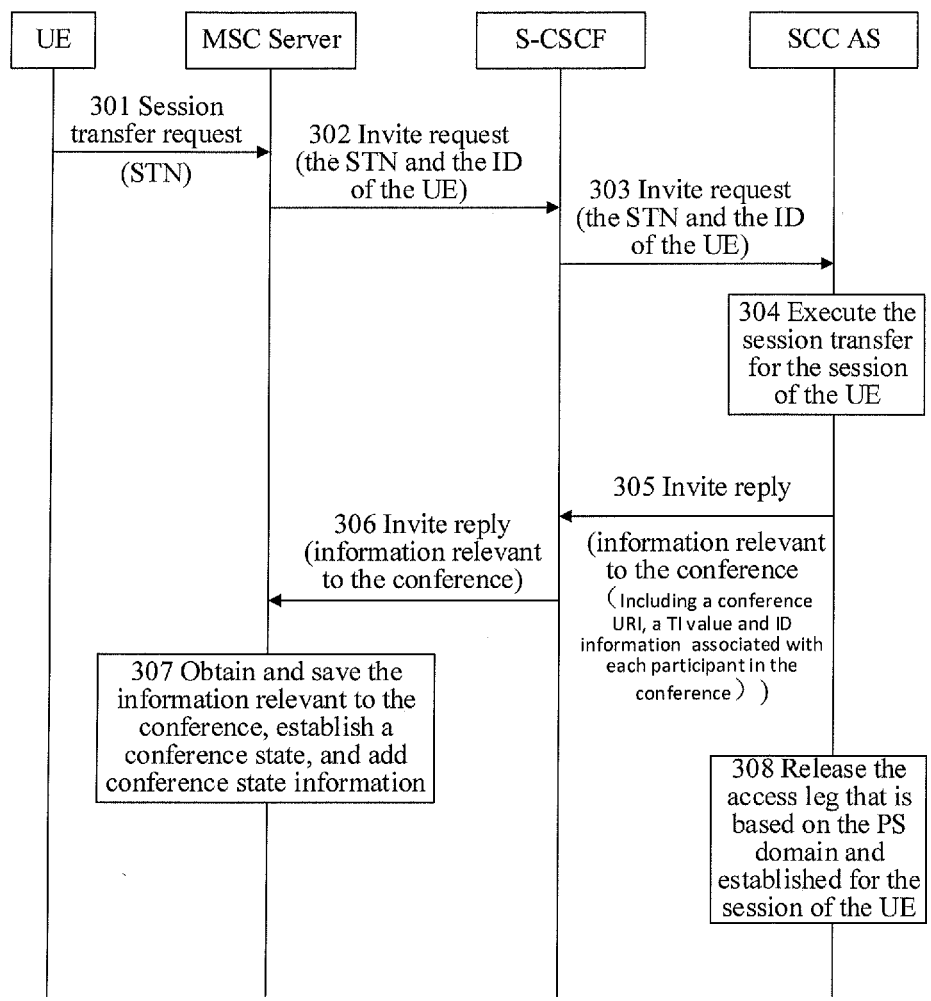
FIG. 3 (Amended)

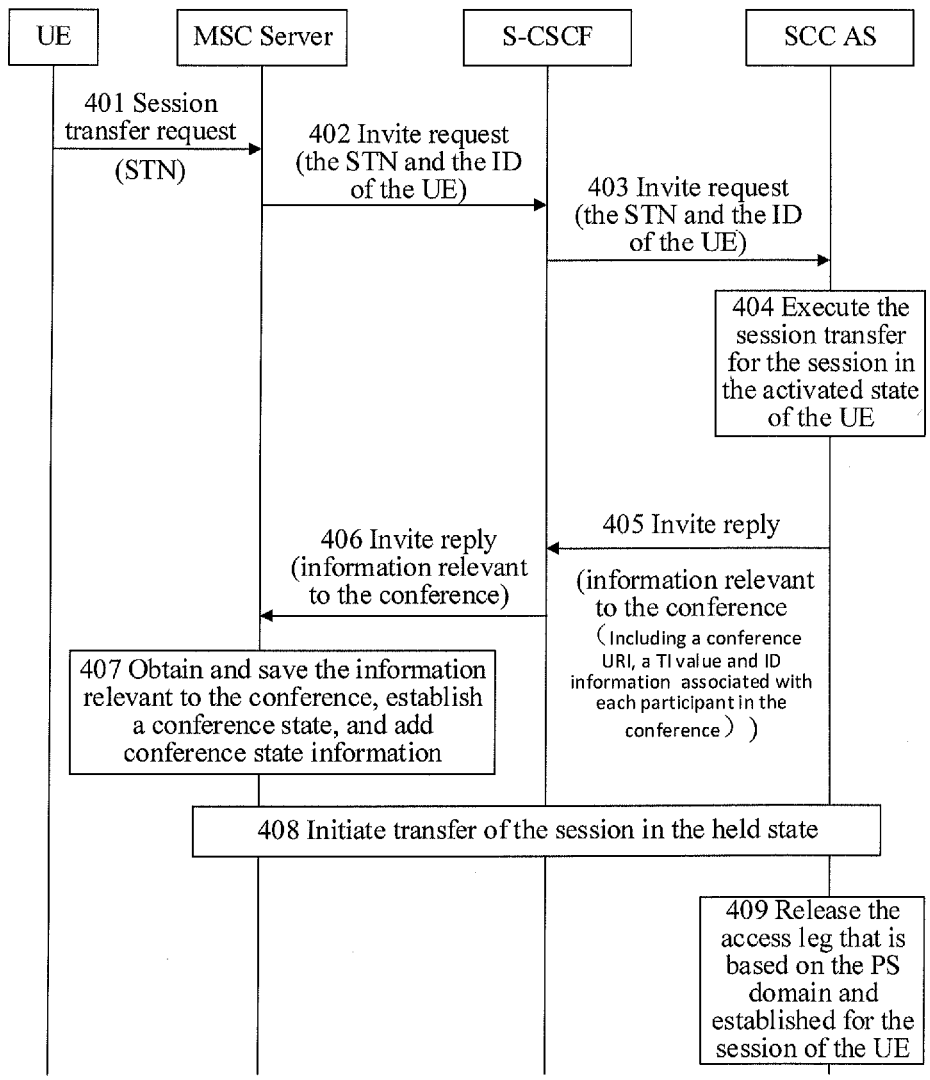
FIG. 4 (Amended)

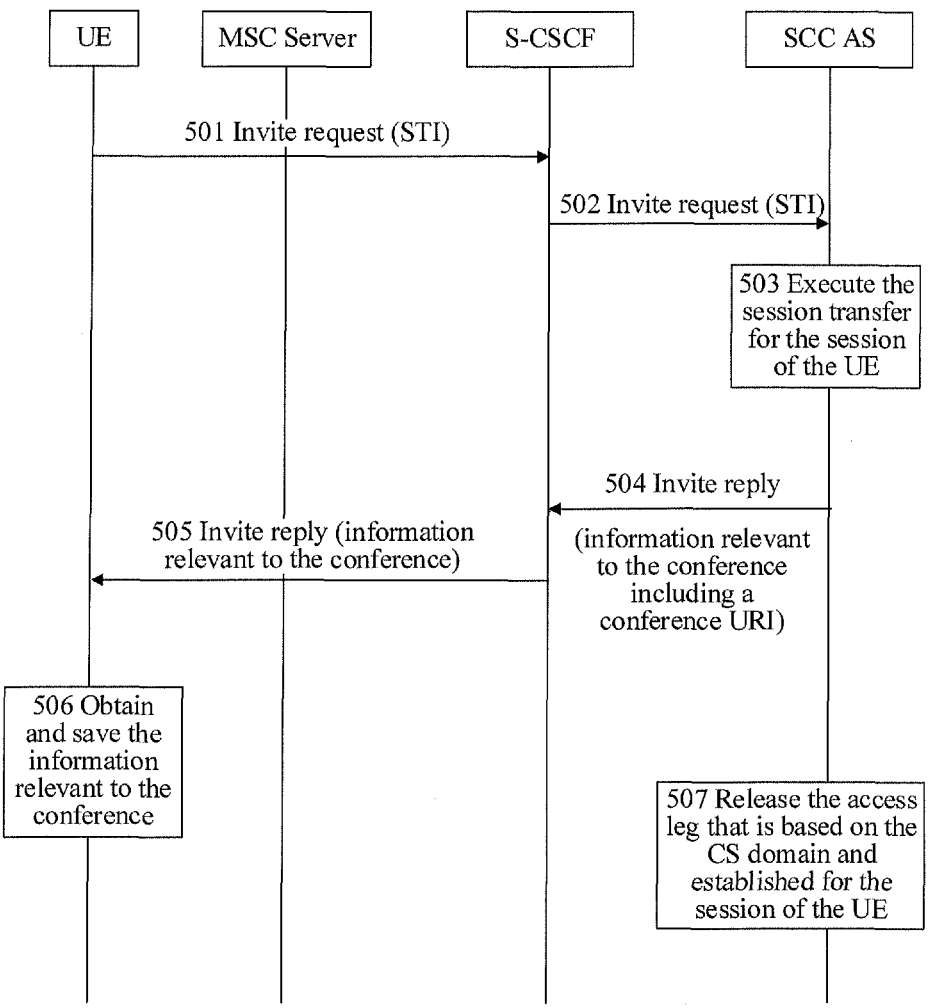
FIG. 5 (Amended)

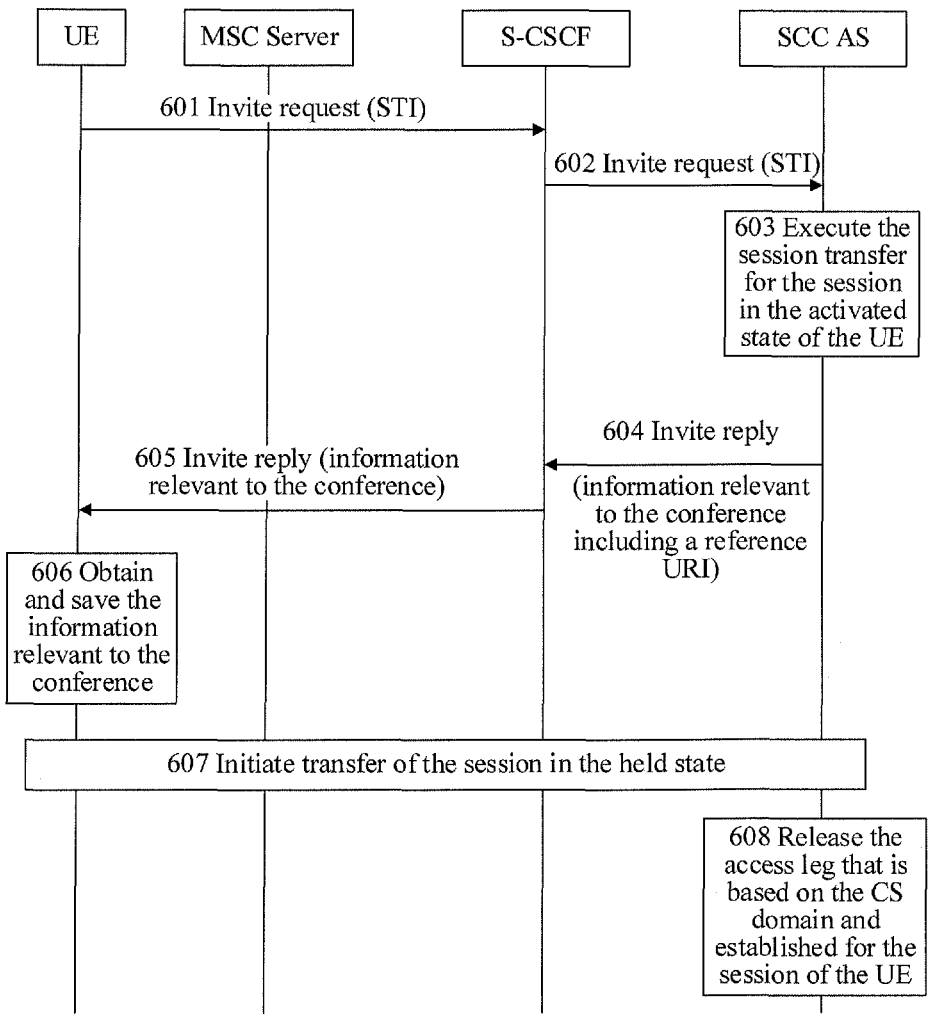
FIG. 6 (Amended)

US 9,392,032 B2

SESSION TRANSFER METHOD, DEVICE AND SYSTEM

CROSS-REFERENCE TO RELATED APPLICATIONS

This application is a continuation of International Application No. PCT/CN2010/072372, filed on Apr. 30, 2010, which claims priority to Chinese Patent Application No. 200910139151.4, filed on May 5, 2009, both of which are hereby incorporated by reference in their entireties.

FIELD OF THE INVENTION

The present invention relates to the communication field, and in particular to a session transfer method, a device and a system.

BACKGROUND OF THE INVENTION

A User Equipment (UE) may perform a session with a communication opposite end through a Circuit Switched (CS) domain or a Packet Switched (PS) domain: when the UE performs a session through the CS domain, a Service Centralization and Continuity Application Server (SCC AS) on a network side establishes an access leg that is based on the CS domain for the session, and the session is performed through the CS domain under the control of the access leg that is based on the CS domain; likewise, when the UE performs a session through the PS domain, the SCC AS establishes an access leg that is based on the PS domain for the session, and the session is performed through the PS domain under the control of the access leg that is based on the PS domain.

When the UE is transferred, for example, transferred from a zone controlled by the PS domain to a zone controlled by the CS domain, or transferred from a zone controlled by the CS domain to a zone controlled by the PS domain, the session of the UE also needs to be transferred. In the prior art, the UE sends a session transfer request to the SCC AS, the SCC AS establishes, according to the session transfer request, an access leg that is based on a target network for the session to be transferred, and releases an access leg of a source network, and the session is performed through the target network under the control of the access leg that is based on the target network.

In the implementation of the present invention, the inventors find that the prior art has at least the following problem. If the transferred UE has at least one session belonging to a conference, and the UE is an initiator of the conference, after the session of the UE is transferred through the method in the prior art, a problem that the conference cannot be controlled may be caused.

SUMMARY OF THE INVENTION

Embodiments of the present invention provide a session transfer method, a device and a system, which can control a conference to which a session belongs after the session is transferred.

To achieve the foregoing objectives, the following technical solutions are adopted in the embodiments of the present invention.

A session transfer method includes: determining whether a UE has at least one session belonging to a conference during a process that a session of the UE is transferred from a source network to a target network; and sending information relevant to the conference to the UE or a Mobile Switching Center (MSC) server if the UE has at least one session belonging to the conference.

A session transfer method includes: obtaining information relevant to a conference sent by an SCC AS under the circumstance that a UE has at least one session belonging to the conference, during a process that a session of the UE is transferred from a PS domain to a CS domain, in which the information relevant to the conference is used to control the conference; and establishing, according to the information relevant to the conference, a conference state for the session belonging to the conference.

A session transfer method includes: obtaining a conference Universal Resource Identifier (URI) of a conference sent by an SCC AS under the circumstance that a UE has at least one session belonging to the conference, during a process that a session of the UE is transferred from a CS domain to a PS domain, in which the conference URI is used for the UE to control the conference.

A session transfer method includes: sending a transfer request of a CS domain to an MSC server during a process that a session of a UE is transferred from a PS domain to the CS domain, so that a network side transfers the session of the UE to the CS domain, and sending information relevant to a conference to the MSC server under the circumstance that the UE has at least one session belonging to the conference; and sending signaling of the CS domain to the MSC server, so that the MSC server controls the conference according to the information relevant to the conference.

An SCC AS includes:
a determination unit, configured to determine whether a UE has at least one session belonging to a conference during a process that a session of the UE is transferred from a source network to a target network; and
a sending unit, configured to send information relevant to the conference to the UE or an MSC server if the determination unit determines that the UE has at least one session belonging to the conference.

An MSC server includes:
an obtaining unit, configured to obtain information relevant to a conference sent by an SCC AS under the circumstance that a UE has at least one session belonging to the conference, during a process that a session of the UE is transferred from a PS domain to a CS domain, in which the information relevant to the conference is used to control the conference; and
an establishment unit, configured to establish, according to the information that is relevant to the conference and obtained by the obtaining unit, a conference state for the session belonging to the conference.

A UE includes:
an obtaining unit, configured to obtain a conference URI of a conference sent by an SCC AS under the circumstance that the UE has at least one session belonging to the conference, during a process that a session of the UE is transferred from a CS domain to a PS domain, in which the conference URI is used to control the conference.

A UE includes:
a first sending unit, configured to send a transfer request of a CS domain to an MSC server during a process that a session of the UE is transferred from a PS domain to the CS domain, so that a network side transfers the session of the UE to the CS domain, and send information relevant to a conference to the MSC server under the circumstance that the UE has at least one session belonging to the conference; and a second sending unit, configured to send signaling of the CS domain to the MSC server, so that the MSC server controls the conference according to the information relevant to the conference.

A communication system includes: an SCC AS and an MSC server, in which the SCC AS is configured to send information relevant to a conference to the MSC server if a UE has at least one session belonging to the conference, during a process that a session of the UE is transferred from a PS domain to a CS domain; and the MSC server is configured to obtain the information relevant to the conference from the SCC AS and establish, according to the information relevant to the conference, a conference state for the session belonging to the conference, in which the information relevant to the conference is used to control the conference.

A communication system includes: an SCC AS and a UE, in which the SCC AS is configured to send a conference URI of a conference to the UE if the UE has at least one session belonging to the conference during a process that a session of the UE is transferred from a CS domain to a PS domain; and the UE is configured to obtain the conference URI from the SCC AS, in which the conference URI is used to control the conference.

In the session transfer method, the device and the system according to the embodiments of the present invention, in the session transfer process, the information relevant to the conference to which the session belongs can be sent to the UE or the MSC server, and the UE or the MSC server can obtain the information relevant to the conference, and after the session transfer, control, according to the information relevant to the conference, the conference to which the session belongs, which solves the problem that the conference to which the session belongs cannot be controlled in the target network after the session transfer in the prior art.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 3 is a timing diagram of a session transfer method according to Embodiment 1 of the present invention;

FIG. 4 is a timing diagram of a session transfer method according to Embodiment 2 of the present invention;

FIG. 5 is a timing diagram of a session transfer method according to Embodiment 3 of the present invention;

FIG. 6 is a timing diagram of a session transfer method according to Embodiment 4 of the present invention;

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative effects shall fall within the protection scope of the present invention.

In order to solve the problem that a conference to which a session belongs cannot be controlled after the session transfer, the embodiments of the present invention provide a session transfer method, a device and a system.

Figure 1:
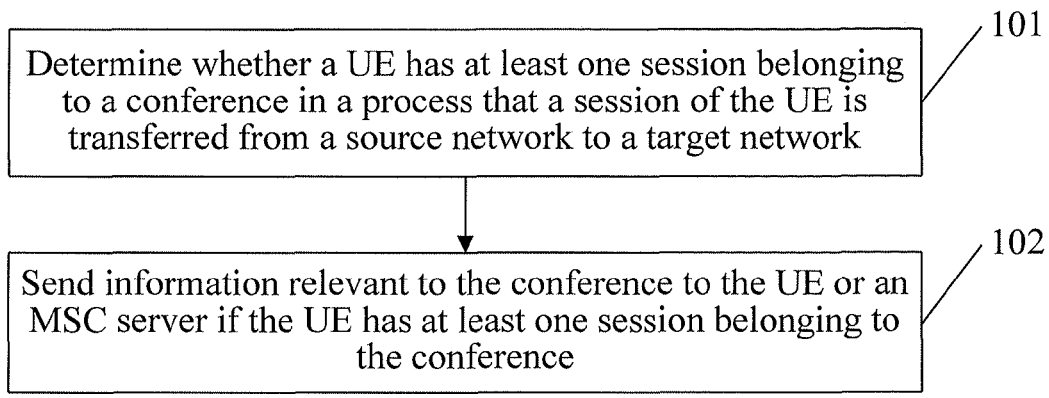
FIG. 1 is a flowchart of a session transfer method according to an embodiment of the present invention.

As shown in FIG. 1, a session transfer method according to an embodiment of the present invention includes:

Step 101: Determine whether a UE has at least one session belonging to a conference during a process that a session of the UE is transferred from a source network to a target network.

The relationship between the source target network and the target network may be as follows:

the source target network is a PS domain/CS domain in a first network, and the target network is a CS domain/PS domain in the first network; or the source target network is a PS domain/CS domain in a first network, and the target network is a CS domain/PS domain in a second network.

Step 102: Send information relevant to the conference to the UE or an MSC server if the UE has at least one session belonging to the conference.

In this embodiment, if the session of the UE is transferred from a PS domain to a CS domain, in step 102, a conference URI, and a Transaction identifier (TI) value and identity (ID) information associated with each participant in the conference are sent to the MSC server, in which a TI is used to identify different sessions; if the session of the UE is transferred from a CS domain to a PS domain, in step 102, a conference URI is sent to the UE.

When the session of the UE is moved from a CS domain to a PS domain, in order to ensure that the TI value and the ID information associated with each participant in the conference can be sent to the MSC server in step 102 in a subsequent process that the session of the UE is moved from the PS domain back to the CS domain, the session transfer method according to the embodiment of the present invention may further include: obtaining and saving the TI value and the ID information associated with each participant in the conference.

In the session transfer method according to the embodiment of the present invention, during the process that the session of the UE is transferred, if the UE has at least one session belonging to the conference, the information relevant to the conference is sent to the UE or the MSC server, so that the UE or the MSC server can control the conference according to the information relevant to the conference after the session transfer, which solves the problem that the conference to which the session belongs cannot be controlled after the session transfer in the prior art.

Figure 2:
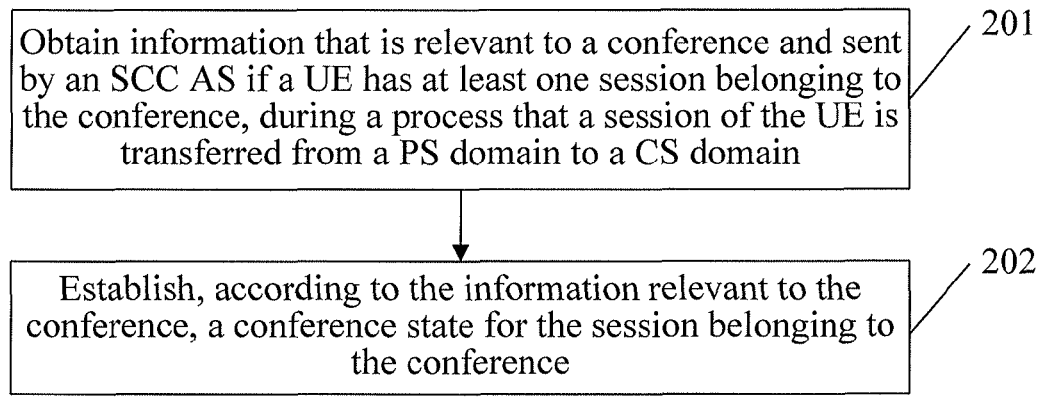
FIG. 2 is a flowchart of a session transfer method according to another embodiment of the present invention.

As shown in FIG. 2, another embodiment of the present invention further provides a session transfer method, which includes the following steps.

Step 201: Obtain information relevant to a conference sent by an SCC AS if a UE has at least one session belonging to the conference, during a process that a session of the UE is transferred from a PS domain to a CS domain, in which the information relevant to the conference is used to control the conference.

In this embodiment, the information relevant to the conference includes: a conference URI, and a TI value and ID information associated with each participant in the conference.

Step 202: Establish, according to the information relevant to the conference, a conference state for the session belonging to the conference.

In the conference transfer method according to the embodiment of the present invention, if the UE has at least one session belonging to the conference, the information relevant to the conference is obtained from the SCC AS, and the conference state is established for the session belonging to the conference, so that the conference can be controlled according to the information relevant to the conference after the session transfer, which solves the problem that the conference to which the session belongs cannot be controlled after the session transfer in the prior art.

Still another embodiment of the present invention further provides a session transfer method, which includes: obtaining a conference URI of a conference sent by an SCC AS if a UE has at least one session belonging to the conference, during a process that a session of the UE is transferred from a CS domain to a PS domain, in which the conference URI is used to control the conference.

In order to ensure that the MSC server can obtain the TI value and the ID information associated with each participant in the conference from the SCC AS when the session of the UE is subsequently moved from the PS domain back to the CS domain, the session transfer method according to the embodiment of the present invention may further include: sending the pre-stored TI value and ID information of each participant in the conference to the SCC AS.

In the session transfer method according to the embodiment of the present invention, if the UE has at least one session belonging to the conference, the conference URI of the conference is obtained from the SCC AS, so that the conference can be controlled according to the conference URI after the session transfer, which solves the problem that the conference to which the session belongs cannot be controlled after the session transfer in the prior art.

Yet another embodiment of the present invention further provides a session transfer method, which includes: sending a transfer request of a CS domain to an MSC server during a process that a session of a UE is transferred from a PS domain to the CS domain, so that a network side transfers the session of the UE to the CS domain, and sending information relevant to a conference to the MSC server under the circumstance that the UE has at least one session belonging to the conference; and sending signaling of the CS domain to the MSC server, so that the MSC server controls the conference according to the information relevant to the conference.

In the session transfer method according to the embodiment of the present invention, a session transfer request of the CS domain is sent to the MSC server, so that the network side transfers the session of the UE to the CS domain, and under the circumstance that the UE has at least one session belonging to the conference, the information relevant to the conference is sent to the MSC server, and the UE sends control signaling of the CS domain, so that the MSC server controls the conference, which solves the problem that the conference to which the session belongs cannot be controlled after the session transfer in the prior art.

In order to enable persons skilled in the art to understand the technical solutions provided by the embodiments of the present invention more clearly, the method for sending and obtaining information according to the embodiments of the present invention is illustrated in detail through specific embodiments in the following.

Embodiment 1

A UE has only one session, the session belongs to a conference, the UE is an initiator of the conference, the UE is moved from a zone controlled by a PS domain to a zone controlled by a CS domain, and the conference center is held in the PS domain, in which the PS domain specifically is a PS-based IP Multimedia Subsystem (IMS) domain, the UE is a UE (a non ICS UE) not supporting a Gm or I1 interface, and an MSC server in the CS domain has an IMS Centralized Service (ICS) enhancement function.

As shown in FIG. 3, a session transfer method according to an embodiment of the present invention includes:

Step 301: The UE sends a session transfer request to the MSC server, in which the session transfer request carries a Session Transfer Number (STN).

In this embodiment, the session transfer request may be a 24.008 set up message.

Step 302: The MSC server generates an Invite request according to the session transfer request sent by the UE, in which the Invite request carries the STN and an ID of the UE; and sends the Invite request to a Server-Call Session Control Function (S-CSCF).

In this embodiment, the MSC server has the ICS enhancement function, and may replace the UE to register in the IMS domain, and when the MSC server replaces the UE to register in the IMS domain in advance, the ID of the UE is an instance ID.

Step 303: The S-CSCF forwards the Invite request sent by the MSC server to an SCC AS.

Step 304: The SCC AS determines, according to the STN carried by the Invite request sent by the S-CSCF, that the Invite request is a transfer request, and executes the session transfer for the session of the UE according to the ID of the UE carried by the Invite request, which includes: completing establishment of an access leg that is based on the CS domain, and using connection information of the access leg that is based on the CS domain to update a remote leg, in which the remote leg is an access leg between the SCC AS and a communication opposite end of the UE.

Step 305: The SCC AS determines that the UE has only one session and the session belongs to a conference, and sends an Invite reply to the S-CSCF, in which the Invite reply carries information relevant to the conference.

In this embodiment, the SCC AS pre-stores the information relevant to the session of the UE, such as the number of sessions included by the UE, state information (activated/held) of each session, and information relevant to the conference to which the session belongs. The SCC AS may search, according to the ID of the UE carried by the Invite request, for the information relevant to the session belonging to the UE, and determine, according to the information relevant to the session, whether the session of the UE includes the session belonging to the conference.

In this embodiment, the information relevant to the conference may include: a conference URI, and a TI value and ID information associated with each participant in the conference; the SCC AS may carry the information relevant to the conference in session state information in the Invite reply.

Step 306: The S-CSCF forwards the Invite reply sent by the SCC AS to the MSC server.

Step 307: The MSC server obtains the information relevant to the conference from the Invite reply, establishes a conference state for the session belonging to the conference, and adds conference state information, for example, that the session belongs to a conference (call in MPTY), in which the information relevant to the conference is used to control the conference.

Step 308: After the session of the UE is transferred successfully, the SCC AS releases the access leg that is based on the PS domain and originally established for the session of the UE, and completes the session transfer from the PS domain to the CS domain.

In actual use, if the UE is in the single radio, the session transfer process is basically the same as the steps shown in FIG. 3, and the difference lies in that: the MSC server initiates a transfer request of the session.

In the CS domain, information may be transmitted between the UE and the MSC server through a 24.008 message or a facility message; after receiving the 24.008 message or the facility message, the MSC server may control, according to the information relevant to the conference obtained in step 307, the conference initiated by the UE, for example, to hold the conference, to resume the conference, to invite a user to join in the conference, to terminate one party in the conference or to release the conference.

Embodiment 2

A UE has a session in an activated state and a session in a held state, the session in the activated state is an ordinary session, the session in the held state belongs to a conference, the UE is an initiator of the conference, the UE is moved from a zone controlled by a PS domain to a zone controlled by a CS domain, and the conference center is held in the PS domain, in which the PS domain specifically is a PS-based IMS domain, the UE is a UE (a non ICS UE) not supporting a Gm or I1 interface, and an MSC server in the CS domain has an ICS enhancement function.

As shown in FIG. 4, a session transfer method according to an embodiment of the present invention includes:

Step 401 to step 403 are the same as step 301 to step 303 shown in FIG. 3, so the details are not described herein again.

Step 404: The SCC AS determines, according to the STN carried by the Invite request sent by the S-CSCF, that the Invite request is a transfer request, and executes, according to the ID of the UE carried by the Invite request, the session transfer for the session in the activated state in the UE. For the specific step of the session transfer, reference may be made to step 304 shown in FIG. 3, so the details are not described herein again.

A session transfer policy may be preset on the SCC AS, for example, in this embodiment, the session transfer policy is to first transfer the session in the activated state, and then transfer the session in the held state; accordingly, in step 404, if the SCC AS finds that the UE has multiple sessions, the SCC AS may transfer the session in the activated state according to the session transfer policy.

Step 405: The SCC AS determines that the UE includes the session belonging to the conference, and sends an Invite reply to the S-CSCF, in which the Invite reply carries information relevant to the conference.

In this embodiment, the information relevant to the conference is carried in session state information of the Invite reply; and for the method by which the SCC AS determines that the UE includes the session belonging to the conference, reference may be made to step 305 shown in FIG. 3, so the details are not described herein again.

Step 406 to step 407 are the same as step 306 to step 307 shown in FIG. 3, so the details are not described herein again.

Step 408: The MSC server initiates transfer of the session in the held state to the SCC AS according to the session state information of the Invite reply.

In this embodiment, the session in the held state belongs to the conference, and in step 408, the MSC server further establishes a conference state for the session in the held state, and adds conference state information (call in MPTY).

Step 409: After the sessions (including the session in the activated state and the session in the held state) of the UE are transferred successfully, the SCC AS releases the access leg that is based on the PS domain and originally established for the sessions (including the session in the activated state and the session in the held state) of the UE, and completes the session transfer from the PS domain to the CS domain.

In actual use, if the UE is in the single radio, the session transfer process is basically the same as steps shown in FIG. 4, and the difference lies in that: the MSC server initiates a transfer request of the session.

In the CS domain, information may be transmitted between the UE and the MSC server through a 24.008 message or a facility message; the MSC server may control, according to the information relevant to the conference obtained in step 407, the conference initiated by the UE, for example, to hold the conference, to resume the conference, to invite a user to join in the conference, to terminate one party in the conference or to release the conference; the UE may convert the session in the activated state into one in the held state through a hold message, or convert the session in the held state into one in the activated state through a facility message.

Embodiment 3

A UE only has one session, the session belongs to a conference, the UE is an initiator of the conference, the UE is moved from a zone controlled by a CS domain to a zone controlled by a PS domain, and the conference center is held in the CS domain, in which the PS domain specifically is a PS-based IMS domain, the UE is a UE (a non ICS UE) not supporting a Gm or I1 interface, and an MSC server in the CS domain has an ICS enhancement function.

As shown in FIG. 5, a session transfer method according to an embodiment of the present invention includes:

Step 501: The UE sends an Invite request to the S-CSCF, and Request-URI in the Invite request is set to a static STI value of the UE, in which the static STI value is pre-configured in the UE, and is used to indicate the session transfer to an SCC AS.

Step 502: The S-CSCF forwards the Invite request sent by the UE to the SCC AS.

Step 503: The SCC AS determines, according to the STI value carried by the Invite request sent by the S-CSCF, that the Invite request is a transfer request, and executes the session transfer for the session of the UE according to the ID of the UE carried by the Invite request, which includes: completing establishment of an access leg that is based on the PS domain, and using connection information of the access leg that is based on the PS domain to update a remote leg, in which the remote leg is an access leg between the SCC AS and a communication opposite end of the UE.

Step 504: The SCC AS determines that the UE only has one session and the session belongs to a conference, and sends an Invite reply to the S-CSCF, in which the Invite reply carries information relevant to the conference.

In this embodiment, the SCC AS pre-stores the information relevant to the session of the UE, such as the number of sessions included by the UE, state information (activated/held) of each session, and information relevant to the conference to which the session belongs. The SCC AS may search, according to the ID of the UE, for the information relevant to the session belonging to the UE, and determine, according to the information relevant to the session, whether the sessions of the UE include the session belonging to the conference.

In this embodiment, the information relevant to the conference may include: conference URI information; the SCC AS may have the information relevant to the conference carried in session state information of the Invite reply.

Step 505: The S-CSCF forwards the Invite reply sent by the SCC AS to the UE.

Step 506: The UE obtains and saves the information relevant to the conference from the Invite reply, in which the information relevant to the conference is used to control the conference.

Step 507: After the session of the UE is transferred successfully, the SCC AS releases the access leg that is based on the CS domain and originally established for the session of the UE, and completes the session transfer from the CS domain to the PS domain.

In the PS domain, the UE may control the conference through PS signaling according to the information relevant to the conference obtained in step 506, for example, to hold the conference, to resume the conference, to invite a user to join in the conference, to terminate one party in the conference or to release the conference.

In the CS domain, a TI value and ID information of each participant in the conference are saved into the UE and the MSC server, and when the UE is transferred from the zone controlled by the CS domain to the zone controlled by the PS domain, the SCC AS does not have the TI value and the ID information of each participant in the conference; in order to ensure that the SCC AS can send the TI value and the ID information of each participant in the conference to the MSC server when the UE is transferred from the zone controlled by the PS domain to the zone controlled by the CS domain, the UE further needs to send the TI value and the ID information of each participant in the conference to the SCC AS, and specifically, the TI value and the ID information of each participant in the conference may be carried in an SDP of the Invite request in step 501 and step 502.

Embodiment 4

A UE has a session in an activated state and a session in a held state, the session in the activated state is an ordinary session, the session in the held state belongs to a conference, the UE is an initiator of the conference, the UE is moved from a zone controlled by a CS domain to a zone controlled by a PS domain, and the conference center is held in the PS domain, in which the PS domain specifically is a PS-based IMS domain, the UE is a UE (a non ICS UE) not supporting a Gm or I1 interface, and an MSC server in the CS domain has an ICS enhancement function.

As shown in FIG. 6, a session transfer method according to an embodiment of the present invention includes:

Step 601 and step 602 are the same as step 501 and step 502 shown in FIG. 5, so the details are not described herein again.

Step 603: The SCC AS determines, according to the STI value carried by the Invite request sent by the S-CSCF, that the Invite request is a transfer request, and executes the session transfer for the session in the activated state in the UE according to the ID of the UE carried by the Invite request. For the specific transfer method, reference may be made to step 503 shown in FIG. 5, so the details are not described herein again.

A session transfer policy may be preset on the SCC AS, for example, in this embodiment, the session transfer policy is to first transfer the session in the activated state, and then transfer the session in the held state; accordingly, in step 603, if the SCC AS finds that the UE has a plurality of sessions, the SCC AS may transfer the session in the activated state according to the session transfer policy.

Step 604: The SCC AS determines that the UE includes the session belonging to the conference, and sends an Invite reply to the S-CSCF, in which the Invite reply carries information relevant to the conference.

In this embodiment, the information relevant to the conference is carried in session state information of the Invite reply; and for the method by which the SCC AS determines that the UE includes the session belonging to the conference, reference may be made to step 504 shown in FIG. 5, so the details are not described herein again.

Step 605 and step 606 are the same as step 505 and step 506 shown in FIG. 5, so the details are not described herein again.

Step 607: The UE initiates transfer of the session in the held state to the SCC AS according to the session state information of the Invite reply.

Step 608: After the sessions (including the session in the activated state and the session in the held state) of the UE are transferred successfully, the SCC AS releases the access leg that is based on the CS domain and originally established for the sessions (including the session in the activated state and the session in the held state) of the UE, and completes the session transfer from the CS domain to the PS domain.

In the PS domain, the UE controls the conference through PS signaling according to the information that is relevant to the conference and obtained in step 606, for example, to hold the conference, to resume the conference, to invite a user to join in the conference, to terminate one party in the conference or to release the conference; and may also converts the session in the activated state into one in the held state or convert the session in the held state into one in the activated state through the PS signaling.

The UE may send a TI value and ID information associated with each participant in the conference to the SCC AS, and specifically, the TI value and ID information associated with each participant in the conference may be carried in an SDP of the Invite request in step 601 and step 602.

In the session transfer method according to the embodiments of the present invention, the information relevant to the conference to which the session belongs can be sent to the UE or the MSC server, and the UE or the MSC server obtains the information relevant to the conference and controls, according to the information relevant to the conference, the conference to which the session belongs after the session transfer, which solves the problem that the conference to which the session belongs cannot be controlled in the target network after the session transfer in the prior art.

Figure 7:
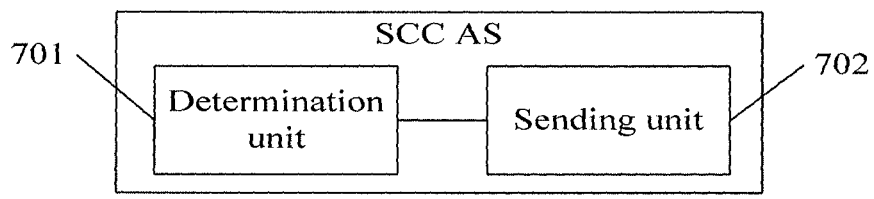
FIG. 7 is a first schematic structural diagram of an SCC AS according to an embodiment of the present invention.

As shown in FIG. 7, an embodiment of the present invention further provides an SCC AS, which includes:

a determination unit 701, configured to determine whether a UE has at least one session belonging to a conference, in a process that a session of the UE is transferred from a source network to a target network; and a sending unit 702, configured to send information relevant to the conference to the UE or an MSC server if the determination unit 701 determines that the UE has at least one session belonging to the conference.

Figure 8:
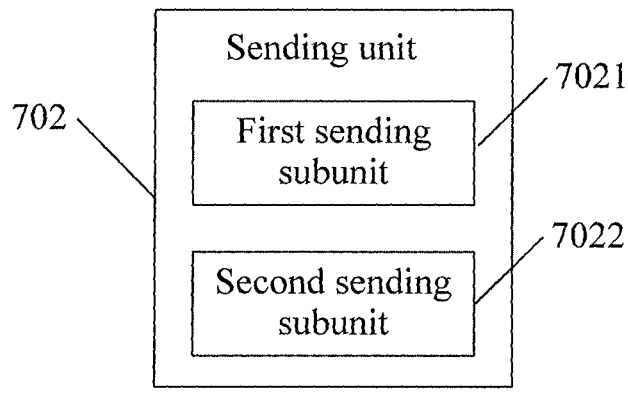
FIG. 8 is a schematic structural diagram of a sending unit 702 in the SCC AS according to the embodiment of the present invention shown in FIG. 7.

Further, as shown in FIG. 8, the sending unit 702 may include:

a first sending subunit 7021, configured to send a conference URI, and a TI value and ID information associated with each participant in the conference to the MSC server if the source network is a PS domain and the target network is a CS domain; and a second sending subunit 7022, configured to send a conference URI to the UE if the source network is a CS domain and the target network is a PS domain.

Figure 9:
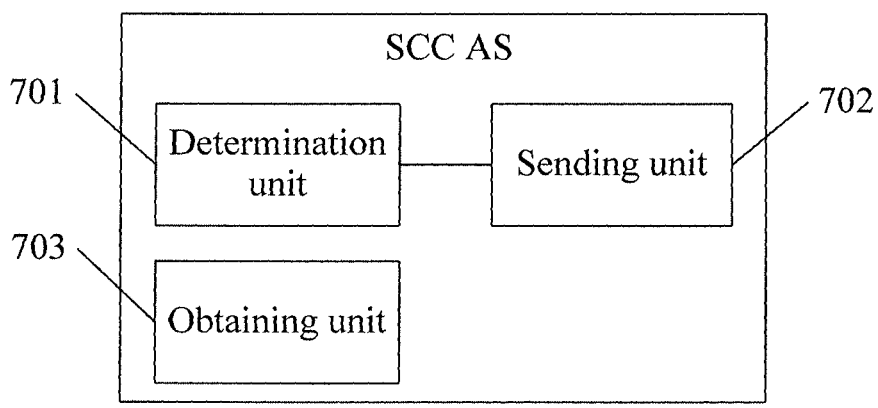
FIG. 9 is a second schematic structural diagram of an SCC AS according to an embodiment of the present invention.

Further, as shown in FIG. 9, the SCC AS may further include:

an obtaining unit 703, configured to obtain and store a TI value and ID information of each participant in the conference if the source network is a CS domain and the target network is a PS domain.

For the specific implementation method of the SCC AS according to the embodiment of the present invention, reference may be made to the method for sending and obtaining information according to the embodiments of the present invention, so the details are not described herein again.

In the SCC AS according to the embodiment of the present invention, in the session transfer process of the UE, if the sessions include at least one session belonging to the conference, the information relevant to the conference is sent to the UE or the MSC server, so that the UE or the MSC server can control the conference according to the information relevant to the conference after the session transfer, which solves the problem that the conference to which the session belongs cannot be controlled after the session transfer in the prior art.

Figure 10:
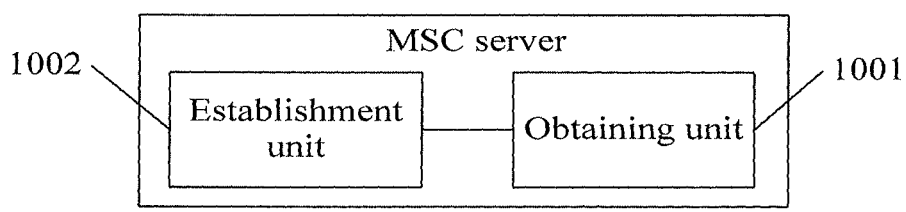
FIG. 10 is a schematic structural diagram of an MSC server according to an embodiment of the present invention.

As shown in FIG. 10, an embodiment of the present invention further provides an MSC server, which includes:

an obtaining unit 1001, configured to obtain information that is relevant to a conference and sent by an SCC AS if a UE has at least one session belonging to the conference, in a process that a session of the UE is transferred from a PS domain to a CS domain, in which the information relevant to the conference is used to control the conference; and an establishment unit 1002, configured to establish a conference state for the session belonging to the conference according to the information that is relevant to the conference and obtained from the obtaining unit 1001.

For the specific implementation method of the MSC server according to the embodiment of the present invention, reference may be made to the method for sending and obtaining information according to the embodiments of the present invention, so that the details are not described herein again.

In the MSC server according to the embodiment of the present invention, if the UE has at least one session belonging to the conference, the information relevant to the conference can be obtained from the SCC AS, and the conference state is established for the session belonging to the conference, so that the conference can be controlled according to the information relevant to the conference after the session transfer, which solves the problem that the conference to which the session belongs cannot be controlled after the session transfer in the prior art.

Figure 11:
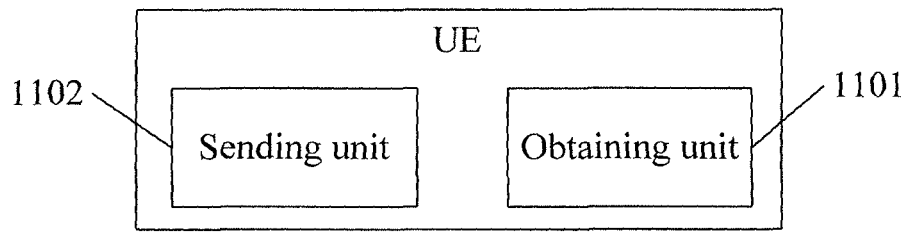
FIG. 11 is a schematic structural diagram of a UE according to an embodiment of the present invention.

As shown in FIG. 11, an embodiment of the present invention further provides a UE, which includes:

an obtaining unit 1101, configured to obtain a conference URI of a conference sent by an SCC AS if the UE has at least one session belonging to the conference, during a process that a session of the UE is transferred from a CS domain to a PS domain, in which the conference URI is used to control the conference.

As shown in FIG. 11, the UE may further include:

a sending unit 1102, configured to send a pre-stored TI value and pre-stored ID information of each participant in the conference to the SCC AS.

For the specific implementation method of the UE according to the embodiment of the present invention, reference may be made to the method for sending and obtaining information according to the embodiments of the present invention, so that the details are not described herein again.

If the UE according to the embodiment of the present invention has at least one session belonging to the conference, the information relevant to the conference can be obtained from the SCC AS, so that the conference can be controlled according to the information relevant to the conference after the session transfer, which solves the problem that the conference to which the session belongs cannot be controlled after the session transfer in the prior art.

Figure 12:
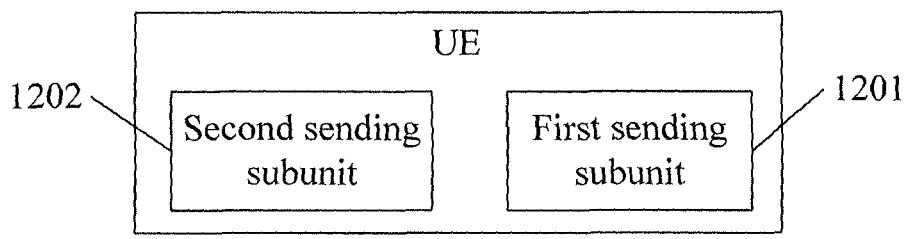
FIG. 12 is a schematic structural diagram of a UE according to another embodiment of the present invention.

As shown in FIG. 12, another embodiment of the present invention further provides a UE, which includes:

a first sending unit 1201, configured to send a transfer request of a CS domain to an MSC server during a process that a session of the UE is transferred from a PS domain to the CS domain, so that a network side transfers the session of the UE to the CS domain, and send information relevant to a conference to the MSC server under the circumstance that the UE has at least one session belonging to the conference; and a second sending unit 1202, configured to send signaling of the CS domain to the MSC server, so that the MSC server controls the conference according to the information relevant to the conference.

In the UE according to the embodiment of the present invention, a session transfer request of the CS domain can be sent to the network side, so that the network side transfers the session of the UE to the CS domain, and under the circumstance that the UE has at least one session belonging to the conference, the information relevant to the conference is sent to the MSC server, and the UE sends control signaling of the CS domain, so that the MSC server controls the conference, which solves the problem that the conference to which the session belongs cannot be controlled after the session transfer in the prior art.

Figure 13:
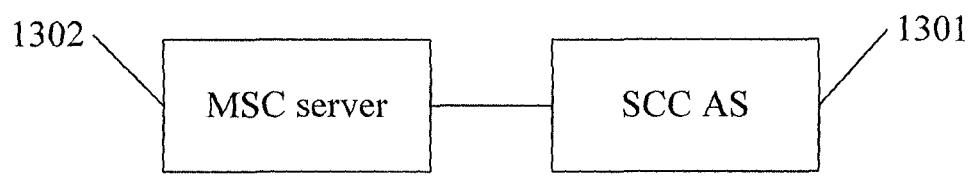
FIG. 13 is a first schematic structural diagram of a communication system according to an embodiment of the present invention.

As shown in FIG. 13, an embodiment of the present invention further provides a communication system, which includes: an SCC AS 1301 and an MSC server 1302.

The SCC AS 1301 is configured to send information relevant to a conference to the MSC server 1302 if a UE has at least one session belonging to the conference during a process that a session of the UE is transferred from a PS domain to a CS domain.

The MSC server 1302 is configured to obtain the information relevant to the conference from the SCC AS 1301 and establish, according to the information relevant to the conference, a conference state for the session belonging to the conference, in which the information relevant to the conference is used to control the conference.

In the communication system according to the embodiment of the present invention, in the session transfer process, the SCC AS can send the information relevant to the conference to which the session belongs to the MSC server, and the MSC server can obtain the information relevant to the conference and establish the conference state for the session belonging to the conference, so that the conference to which the session belongs can be controlled according to the information relevant to the conference and the conference state information after the session transfer, which solves the problem that the conference to which the session belongs cannot be controlled in the target network after the session transfer in the prior art.

Figure 14:
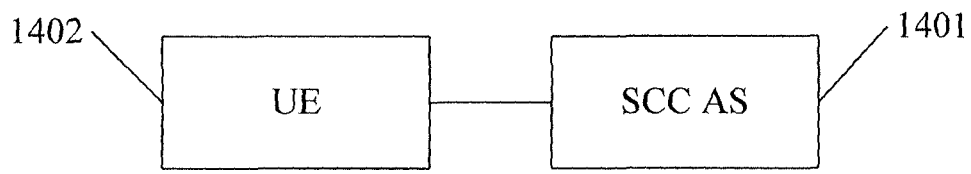
FIG. 14 is a second schematic structural diagram of a communication system according to an embodiment of the present invention.

As shown in FIG. 14, an embodiment of the present invention further provides a communication system, which includes: an SCC AS 1401 and a UE 1402.

The SCC AS 1401 is configured to send a conference URI of a conference to the UE 1402 if the UE has at least one session belonging to the conference during a process that a session of the UE 1402 is transferred from a CS domain to a PS domain.

The UE 1402 is configured to obtain the conference URI of the conference from the SCC AS 1401, in which the conference URI is used to control the conference.

In the communication system according to the embodiment of the present invention, in the session transfer process, the SCC AS can send the information relevant to the conference to which the session belongs to the UE, and the UE can obtain and save the information relevant to the conference, so that the conference to which the session belongs can be controlled according to the information relevant to the conference after the session transfer, which solves the problem that the conference to which the session belongs cannot be controlled in the target network after the session transfer in the prior art.

It should be noted that: the UE involved in the embodiments of the present invention includes, but is not limited to, a UE (a non ICS UE) not supporting the Gm or I1 interface or an ICS UE with a unusable Gm/I1 interface; generally, the information relevant to the conference involved in the embodiments of the present invention includes one or any combination of the conference URI, the TI value or the ID information associated with each participant in the conference, for example, when the information relevant to the conference includes the conference URI and the ID information, the TI value associated with each participant in the conference is optional; the session transfer method, the device and the system according to the embodiments of the present invention may be applied in a wireless communication network.

Persons of ordinary skill in the art may understand that all or part of the steps of the method according to the embodiments of the present invention may be implemented by a program instructing relevant hardware. The program may be stored in a computer readable storage medium, such as a Read-Only Memory (ROM)/Random Access Memory (RAM), a magnetic disk or a Compact Disk.

The foregoing descriptions are merely several embodiments of the present invention, but not intended to limit the present invention. Various variations and modifications made by persons skilled in the art within the technical scope described in the present invention shall fall within the protection scope of the present invention. Therefore, the protection scope of the present invention is subject to the appended claims.

What is claimed is:

1. A session transfer method, comprising:
receiving, by a Service Centralization and Continuity Application Server (SCC AS), a session transfer request from a User Equipment (UE) via a Server-Call Session Control Function (S-CSCF); wherein the session transfer request is configured to request to transfer a session of the UE from a Circuit Switched (CS) domain to a Packet Switched (PS) domain;
establishing, by the SCC AS, in response to receiving the session transfer request, a first access leg that is based on the PS domain, and updating a first remote leg with connection information of the first access leg that is based on the PS domain, wherein the first remote leg is an access leg between the SCC AS and a communication opposite end of a first session belonging to the UE;
sending, by the SCC AS, information relevant to a conference to the UE via the S-CSCF when the SCC AS determines, according to pre-stored information relevant to sessions of the UE, that a second session of the UE belongs to the conference; wherein the information relevant to the conference is capable of being used by the UE to control the conference;
after the SCC AS sends information relevant to the conference to the UE via the S-CSCF, establishing, by the SCC AS, a second access leg that is based on the PS domain, and updating a second remote leg with connection information of the second access leg that is based on the PS domain, wherein the second remote leg is an access leg between the SCC AS and a communication opposite end of the second session belonging to the UE.

2. The method according to claim 1, wherein the information relevant to the conference comprises a conference Universal Resource Identifier (URI) of the conference.

3. The method according to claim 1, wherein the conference involves at least two participants and the method further comprises:
obtaining and saving, by the SCC AS, a Transaction identifier (TI) value and identity (ID) information associated with each participant in the conference from the UE via the S-CSCF.

4. The method according to claim 3, further comprising:
sending, by the SCC AS, a conference Universal Resource Identifier (URI) of the conference, and the stored TI value and the stored ID information associated with each participant in the conference to a Mobile Switching Center (MSC) server when the first session or the second session of the UE is transferred back from the CS domain to the PS domain.

5. A session transfer method, comprising:
receiving, at a Service Centralization and Continuity Application Server (SCC AS), a session transfer request from a Mobile Switching Center (MSC) server via a Server-Call Session Control Function (S-CSCF); wherein the session transfer request is configured to request to transfer a session of a User Equipment (UE) from a Packet Switched (PS) domain to a Circuit Switched (CS) domain;
establishing, by the SCC AS, in response to receiving the session transfer request, a first access leg that is based on the CS domain, and updating a first remote leg with connection information of the first access leg that is based on the CS domain, wherein the first remote leg is an access leg between the SCC AS and a communication opposite end of a first session belonging to the UE;
sending, by the SCC AS, information relevant to a conference to the MSC server via the S-CSCF when the SCC AS determines, according to pre-stored information relevant to sessions of the UE, that a second session of the UE belongs to the conference; wherein the information relevant to the conference is capable of being used by the MSC server to control the conference;

after the SCC AS sends information relevant to the conference to the MSC server via the S-CSCF, establishing, by the SCC AS, a second access leg that is based on the CS domain, and updating a second remote leg with connection information of the second access leg that is based on the CS domain, wherein the second remote leg is an access leg between the SCC AS and a communication opposite end of the second session belonging to the UE.

6. The method according to claim 5, wherein the conference involves at least two participants and the information relevant to the conference comprises a conference Universal Resource Identifier (URI) of the conference, and a Transaction identifier (TI) value and identity (ID) information associated with each participant in the conference.

7. The method according to claim 5, further comprising:

establishing, by the MSC Server, a conference state for the session belonging to the conference according to the information relevant to the conference.

* * * * *